UNITED STATES PATENT OFFICE.

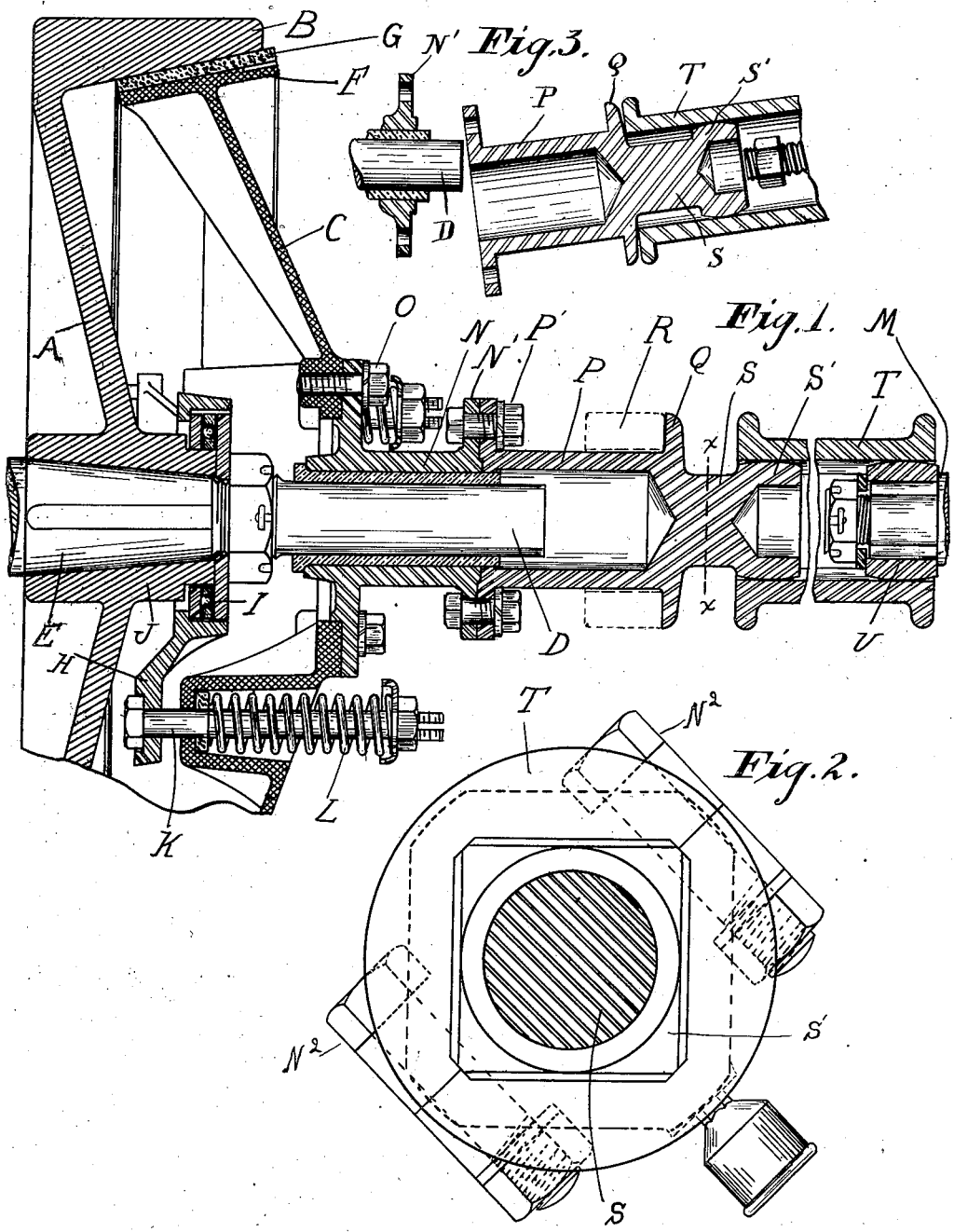

HOWARD E. COFFIN, OF DETROIT, MICHIGAN, ASSIGNOR TO CHALMERS-DETROIT MOTOR COMPANY, OF DETROIT, MICHIGAN, A CORPORATION OF MICHIGAN.

COUPLING FOR POWER TRANSMISSION IN MOTOR-VEHICLES.

934,043.

Specification of Letters Patent. Patented Sept. 14, 1909.

Application filed November 6, 1908. Serial No. 461,418.

*To all whom it may concern:*

Be it known that I, HOWARD E. COFFIN, a citizen of the United States of America, residing at Detroit, in the county of Wayne and State of Michigan, have invented certain new and useful Improvements in Couplings for Power Transmission in Motor-Vehicles, of which the following is a specification, reference being had therein to the accompanying drawings.

The invention relates to power transmission in motor vehicles, and has particular reference to the means employed for coupling the main clutch with the longitudinal transmission shaft.

It is the object of the invention to obtain a construction by which the clutch may be readily disconnected from the transmission shaft and disassembled, and to this end the invention consists in the peculiar construction and arrangement of a coupling member as hereinafter set forth.

In the drawings—Figure 1 is a vertical longitudinal section through the main clutch mechanism and a portion of the main transmission shaft showing the coupling connection therebetween; Fig. 2 is a section on line $x$—$x$, Fig. 1; Fig. 3 is a view similar to Fig. 1 showing the manner of detaching the coupling.

A is the motor fly wheel, the flange B of which forms the conical seat member of the clutch.

C is the coöperating member of the clutch, which is sleeved upon an extension D of the motor shaft E and is provided with a conical flange F and a flexible facing G for engaging the clutch B.

H is a head having a ball bearing I upon the hub J of the fly wheel, and having secured thereto the outwardly projecting pins K. Upon these pins are sleeved the springs L which bear upon the member C and yieldingly press the same to its seat.

The member C of the clutch is connected to the main power transmission shaft M through the medium of a universal coupling which is constructed as follows: N is the hub for the member C which is formed of a separate member secured by the tap bolts O. This hub member N at its outer end is provided with a flange N' to which is secured an extension member P. The member P is provided with a flange Q which forms a bearing for the clutch releasing rod (not shown). This arm is preferably provided with roller bearings R (shown in dotted lines), which bear against the flange Q. Beyond the flange Q the member P has a portion S of reduced diameter, and at its outer end a portion S' of square or polygonal section which forms one member of the universal coupling. The coöperating member of the coupling consists of a sleeve T having a recess corresponding in section to the member S' and being of a length to engage said member, and also a similar square or polygonal member U on the end of the transmission shaft M. As shown the member T is formed of two parts bolted together by bolts $N^2$.

Between the members S' and U sufficient clearance space is provided for the full amount of travel of the member C in releasing the clutch, while the distance between the end of the member U and the end of the shaft D is equal to the length of the member P. This permits of detaching the member P at any time, by merely removing the square bolts P' which attach it to the flange N' and then slipping it backward in the recess in the member T until its opposite end clears the end of the shaft D. The shaft M and coupling may then be lowered or moved angularly out of alinement with the shaft P after which the clutch may be disassembled.

What I claim as my invention is:

1. The combination with a drive shaft and a transmission shaft having their adjacent ends in normal alinement and spaced from each other, of a clutch having its movable member sleeved on the end of said drive shaft, a member detachably secured to said movable member forming an extension thereof beyond said drive shaft, and being of a length no greater than the distance between said drive shaft and transmission shaft, and a coupling sleeve for said extension member and transmission shaft telescopically engaging the former, for the purpose described.

2. The combination with a drive shaft and a transmission shaft having its inner end normally in alinement with said drive shaft but spaced therefrom of a clutch having its movable member sleeved upon the end of said drive shaft, an extension member for said movable member of the clutch, of a length no greater than the distance between said drive and transmission shafts, the outer end of said extension forming the male member of a universal coupling and a coupling sleeve telescopically engaging said male member and connecting the same to said transmission shaft.

3. The combination with a drive shaft and an axially alined transmission shaft spaced therefrom, of a clutch having its movable member sleeved upon the inner end of said drive shaft, an extension for said movable member having a flange coupling therewith and being of no greater length than the space between said drive and transmission shafts, a shoulder on said extension forming a bearing for the clutch releasing member and the outer end of said extension member being fashioned to form the male member of a universal coupling and a coöperating member for said coupling telescopically engaging the male member connecting the same to said transmission shaft.

In testimony whereof I affix my signature in presence of two witnesses.

HOWARD E. COFFIN.

Witnesses:
JAMES P. BARRY,
NELLIE KINSELLA.